Patented Jan. 7, 1941

2,227,804

UNITED STATES PATENT OFFICE 2,227,804

CORROSION INHIBITOR

Edgar C. Britton and Francis N. Alquist, Midland, Mich., assignors to The Dow Chemical Company, Midland, Mich., a corporation of Michigan No Drawing. Application October 21, 1937, Serial No. 170,258

3 Claims. (Cl. 23—248)

This invention concerns a new agent for inhibiting the corrosive action of acids towards metals, and acid solutions containing said agent.

The new agent is an aminated monochlorinated phenyl-diphenyl oxide composition which is prepared by the successive chlorination and amination of a mixture of isomeric phenyl-diphenyl oxides. Such mixture is obtained from the tars remaining after the distillation of phenol from the reaction product of the alkaline hydrolysis of chlorobenzene. The mixture of phenyl-diphenyl oxides is separated by vacuum distillation from the aforesaid tar, and is a white, alkali-insoluble solid, melting below 100° C. and distilling above 350° C. at atmospheric pressure. Phenyl-diphenyl oxides, or mixtures thereof, prepared in other ways can also be used, however, for producing our new composition.

When the aforesaid mixture of phenyl-diphenyl oxides prepared from phenol tars is chlorinated to an average chlorine content corresponding to monochlorinated phenyl-diphenyl oxide, a product is obtained which is a thick viscous liquid distilling at approximately 225°–265° C. at 30 millimeters absolute pressure. Such monochlorinated product is then heated with an excess of aqueous ammonia, e. g. 10 moles, under pressure at a temperature preferably between 190° and 250° C. in the presence of a copper compound as catalyst, according to the usual method of aminating halogenated compounds. A crude aminated product is obtained in which at least a considerable proportion, but not necessarily all, of the chlorine of the monochlorinated phenyl-diphenyl oxide has been substituted by the amino (NH$_2$) group. Such crude aminated product is a viscous brown oil having a specific gravity of about 1.06 to 1.08 at 150/24° C., and a boiling range of about 155°–210° C. under 6 millimeters pressure. Its nitrogen content may vary from about 2.9 to as much as about 7.6 per cent by weight while the chlorine content may vary from a trace to as much as 3.5 per cent. The product is a mixture of compounds comprising isomeric mono-amino-phenyl-diphenyl oxides accompanied by varying amounts of chloro-derivatives which were not reacted in the amination treatment.

The crude product contains residual amounts of copper compounds derived from the catalyst used in the amination reaction, which should be removed to adapt the material for use as a corrosion inhibitor. Such removal of copper compounds is effected by extraction with aqueous ammonia, preferably assisted by moderate heating. Except for the removal of copper compounds, however, no further purification of the crude aminated monochlorinated product is required, or even desirable, to prepare it for use as a corrosion inhibitor.

The following examples are illustrative of suitable procedures for preparing our new composition consisting of aminated monochlorinated phenyl-diphenyl oxide:

Example 1

A mixture of 250 grams of monochlorinated phenyl-diphenyl oxide, 350 cc. of 28 per cent ammonium hydroxide solution, and 20 grams of cuprous oxide was heated with agitation in a bomb at 225° C. for 24 hours. The bomb was then cooled and opened and excess ammonia was driven off the liquid reaction product by heating, whereupon the product separated in two layers, an upper aqueous layer and a lower oily layer. The aqueous layer was removed by decantation and one liter of ammonium hydroxide was added to the residual oily layer. The bomb was then closed and heated with agitation at 150° C. for 2 hours after which it was again cooled, opened, and the ammonia and water were removed as before. This extraction process was repeated twice, whereby the oily layer comprising the product was freed of copper. The product thus obtained was a high-boiling, oily liquid, soluble in common organic solvents but only very slightly soluble in water.

Example 2

28 pounds of monochlorinated phenyl-diphenyl oxide was placed in a high pressure autoclave together with 120 pounds of 28 per cent ammonium hydroxide solution and 0.5 pounds of cuprous chloride. The mixture was heated at 250° C. for 21 hours, during which time the pressure within the autoclave remained fairly constant at 850 pounds per square inch. After cooling and opening the autoclave, the ammonia and water were removed and the product extracted with ammonium hydroxide as in Example 1 to give a reaction product substantially free of copper. There was obtained 31.5 pounds of aminated mono-chlor-phenyl-diphenyl oxide.

As already mentioned, the copper free product prepared as above has been found to be a highly efficient corrosion inhibitor for aqueous mineral acids, e. g. hydrochloric, sulphuric, and nitric acids. For such purpose it is conveniently employed in the form of a solution in a water-miscible alcohol, e. g. methanol or ethanol, a suitable strength of solution containing from 35 to 50 per cent by weight of the aminated monochlorinated phenyl-diphenyl oxide composition. The alcohol acts as a blending agent to promote the solution or dispersion of the inhibitor in the aqueous acid solution. A very small amount of the inhibitor, e. g. from 0.1 to 2.0 per cent by volume, is ordinarily sufficient substantially to inhibit the action of the acid upon common metals, such as iron or steel.

The inhibiting power of aminated monochlorinated phenyl-diphenyl oxide may be demonstrated by the so-called "beaker test," which makes use of a small sand-blasted strip of iron, usually having the dimensions, 1 inch by 2⅞ inches by ⅛ inch. Such strip is weighed and placed in a glass vessel containing about 150 cc. of a 15 per cent aqueous hydrochloric acid solution and the desired amount of inhibitor. The solution is heated at 150° F. for 16 hours, at the end of which time the strip is removed from the solution, dried, and weighed. A blank test is also made using uninhibited acid under identical conditions. The rate of corrosion is calculated from the loss in weight of the strip and is usually expressed in terms of pounds loss of iron per day per square foot of iron surface originally exposed to the acid. The efficiency of the inhibitor may be calculated from the formula:

$$\frac{\text{Weight loss without inhibitor} - \text{Weight loss with inhibitor}}{\text{Weight loss without inhibitor}} \times 100 = \%\text{efficiency}$$

The following table shows the results of such tests using 15 per cent hydrochloric acid solutions to which varying proportions of aminated monochlorinated phenyl-diphenyl oxide were added:

| Amount of inhibitor, percent by volume | Corrosion loss, pounds per square foot per day | Efficiency, percent |
|---|---|---|
| 0.0 (2 hour test) | 1.035 | 0.0 |
| 0.1 | 0.647 | 37.5 |
| 0.2 | 0.306 | 70.5 |
| 0.3 | 0.206 | 80.2 |
| 0.4 | 0.136 | 86.8 |
| 0.5 | 0.0785 | 92.4 |
| 0.7 | 0.0182 | 98.2 |
| 0.9 | 0.0134 | 98.7 |
| 1.0 | 0.0146 | 98.6 |
| 1.4 | 0.0109 | 98.9 |
| 1.5 | 0.0095 | 99.1 |
| 2.0 | 0.0087 | 99.2 |

Other modes of applying the principle of our invention may be employed, change being made as regards the method or compositions herein disclosed, provided the steps or ingredients stated by any of the following claims or the equivalent of such stated steps or ingredients be employed.

We therefore particularly point out and distinctly claim as our invention:

1. An aqueous mineral acid solution containing a substantially copper-free mono-aminated phenyl-diphenyl oxide composition produced by reacting ammonia with monochlorinated phenyl-diphenyl oxide and being an oily liquid distilling between about 155° C. and about 210° C. under 6 millimeters pressure, having a specific gravity of about 1.06–1.08 at 150° C., a chlorine content of about 0.0–3.5 per cent, and a nitrogen content of about 2.9–7.6 per cent, said composition being present in the aqueous mineral acid solution in an amount sufficient to inhibit the action of said acid on ferrous metals.

2. An aqueous hydrochloric acid solution containing a substantially copper-free mono-aminated phenyl-diphenyl oxide composition produced by reacting ammonia with monochlorinated phenyl-diphenyl oxide and being an oily liquid distilling between about 155° C. and about 210° C. under 6 millimeters pressure and having a specific gravity of about 1.06–1.08 at 150° C., a chlorine content of about 0.0–3.5 per cent, and a nitrogen content of about 2.9–7.6 per cent, said composition being present in the aqueous mineral acid solution in an amount sufficient to inhibit the action of said acid on ferrous metals.

3. The method of inhibiting the corrosive action of an aqueous mineral acid on ferrous metals which comprises adding to the acid a relatively small amount of an alcoholic solution of a substantially copper-free mono-aminated phenyl-diphenyl oxide composition produced by reacting ammonia with mono-chlorinated phenyl-diphenyl oxide, said composition being an oily liquid distilling between about 155° C. and about 210° C. under 6 millimeters of pressure and having a specific gravity of about 1.06–1.08 at 150° C., a chlorine content of about 0.0–3.5 per cent, and a nitrogen content of about 2.9–7.6 per cent.

EDGAR C. BRITTON.
FRANCIS N. ALQUIST.